US008539468B2

(12) United States Patent
Popov et al.

(10) Patent No.: US 8,539,468 B2
(45) Date of Patent: Sep. 17, 2013

(54) SYSTEM AND METHODS FOR REPLACING SOFTWARE APPLICATION CLASSES USING TRANSPARENT OBJECT ADAPTERS

(75) Inventors: Petko Popov, Rockville, MD (US); Michael Sielian, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 12/032,965

(22) Filed: Feb. 18, 2008

(65) Prior Publication Data
US 2009/0210865 A1 Aug. 20, 2009

(51) Int. Cl.
*G06F 9/44* (2006.01)

(52) U.S. Cl.
USPC ............................ 717/162; 717/165; 717/167

(58) Field of Classification Search
None
See application file for complete search history.

(56) References Cited

U.S. PATENT DOCUMENTS

| | | | | | |
|---|---|---|---|---|---|
| 5,692,195 | A | * | 11/1997 | Conner et al. | 717/162 |
| 5,920,725 | A | * | 7/1999 | Ma et al. | 717/171 |
| 6,047,295 | A | * | 4/2000 | Endicott et al. | 1/1 |
| 6,102,965 | A | * | 8/2000 | Dye et al. | 717/167 |
| 6,154,878 | A | * | 11/2000 | Saboff | 717/173 |
| 6,216,262 | B1 | * | 4/2001 | Martin | 717/162 |
| 6,430,703 | B1 | * | 8/2002 | Connor et al. | 714/20 |
| 6,473,773 | B1 | * | 10/2002 | Cheng et al. | 707/814 |
| 6,621,505 | B1 | * | 9/2003 | Beauchamp et al. | 715/764 |
| 6,842,891 | B2 | * | 1/2005 | Zhang et al. | 717/162 |
| 6,892,320 | B1 | * | 5/2005 | Roush | 714/15 |
| 6,934,944 | B2 | * | 8/2005 | McGuire | 717/165 |
| 6,968,538 | B2 | * | 11/2005 | Rust et al. | 717/108 |
| 7,020,659 | B2 | * | 3/2006 | Yorke | 1/1 |
| 7,174,379 | B2 | * | 2/2007 | Agarwal et al. | 717/165 |
| 7,305,669 | B2 | * | 12/2007 | Roush | 717/170 |
| 7,533,377 | B2 | * | 5/2009 | Appavoo et al. | 717/168 |
| 7,584,232 | B2 | * | 9/2009 | Guo | 1/1 |
| 7,676,560 | B2 | * | 3/2010 | McCollum | 717/167 |

(Continued)

OTHER PUBLICATIONS

Dominic Duggan, Zhaobin Wu, "Adaptable Objects for Dynamic Updating of Software Libraries", Proceedings of First International Workshop on Unanticipated Software Evolution 2002; published online; [retrieved on Nov. 15, 2011]; Retrieved from Internet <URL:http://www.iai.uni-bonn.ed/~gk/use/2002/use2002onlineProceedings.zip>; pp. 1-7.*

(Continued)

*Primary Examiner* — Thuy Dao
*Assistant Examiner* — Xi D Chen
(74) *Attorney, Agent, or Firm* — Novak Druce Connolly Bove + Quigg LLP

(57) ABSTRACT

A computer-implemented method for creating transparent object adapters for replaced classes in an multi-subsystem application is provided. The method includes determining whether an original class of the original subsystem is referenced by at least one other of the multiple subsystems in response to substituting a new subsystem for an original one. If the original class is referenced by at least one other of the multiple subsystems, a pair of corresponding classes for the original class is generated. One of the generated classes defines an object adapter class having the same name and package as the original class, the other class defining a new class. The method further includes configuring the object adapter class to export methods referenced by at least one of the other subsystems and to transform data and/or handle references to adapter objects passed as parameters or returned values. Additionally, the method includes configuring the object adapter class and the new class to maintain references to one another.

16 Claims, 3 Drawing Sheets

(56) References Cited

U.S. PATENT DOCUMENTS

| | | | |
|---|---|---|---|
| 7,698,597 B2* | 4/2010 | Mendoza et al. | 714/35 |
| 7,721,277 B1* | 5/2010 | Thyagarajan et al. | 717/165 |
| 7,761,863 B2* | 7/2010 | Illowsky et al. | 717/167 |
| 7,818,736 B2* | 10/2010 | Appavoo et al. | 717/168 |
| 7,818,740 B2* | 10/2010 | Bankston et al. | 717/173 |
| 7,895,589 B2* | 2/2011 | Gilfix et al. | 717/167 |
| 7,954,085 B2* | 5/2011 | Colgrave | 717/120 |
| 2001/0044856 A1* | 11/2001 | Agesen et al. | 709/315 |
| 2002/0104077 A1* | 8/2002 | Charnell et al. | 717/162 |
| 2002/0170047 A1* | 11/2002 | Swetland | 717/162 |
| 2003/0037323 A1* | 2/2003 | Bae | 717/170 |
| 2003/0191870 A1* | 10/2003 | Duggan | 709/331 |
| 2004/0010774 A1* | 1/2004 | Blais et al. | 717/165 |
| 2005/0144590 A1* | 6/2005 | Limprecht et al. | 717/167 |
| 2012/0151464 A1* | 6/2012 | Koren et al. | 717/165 |

OTHER PUBLICATIONS

Yarom Gabay, Assaf J.Kfoury, "Towards Formalizing Java's Week References", Boston University, Computer Science Department, Technical Report, 2006; pblished online; [retrieved on Nov. 15, 2011]; Retrieved from Internet <URL:http://www.dcommon.bu.edu/xmluindle/2144/1891>; pp. 1-30.*

Robert Pawel Bialek, "Dynamic Updates of Existing Java Applications", Ph.D. Dissertation, Jun. 9, 2006; [retrieved on Nov. 15, 2011]; Retrieved from Internet <URL:http://nanopar.dk/hjemmesider/ansatte/bialek/Publications/phd.pdf>; pp. 1-184.*

Malabarba, et al., "Runtime Support for Type-Safe Dynamic Java Classes", 2000 Springer-Verlag;[retrieved on Nov. 15, 2011]; Retrieved from Internet <URL:http://www.www.springerlink.com/content/usvmqkg8e33r960h/fulltext.pdf>;pp. 337-361.*

Michael Hicks, Scott Nettles, "Dynamic Software Updating", ACM 2005; [retrieved on Nov. 14, 2011]; Retrieved from Internet <URL:http://dl.acm.org/citation.cfm?id=1108971>; pp. 1049-1096.*

Gisli Hjalmtysson, Robert Gray, "Dynamic C++ Classes A lightweight mechanism to updae code in a running program", 1998 Proceedings of the annual conference on USENIX Annual Technical Conference; [retrieved on Jan. 13, 2011]; Retrieved from Internet <URL:http://citeseerx.ist.psu.edu/viewdoc/download?doi=10.1.1.30.6578&rep=rep1&type=pdf>; pp. 1-13.*

Hui, et al., "Position Summary: Supporting Hot-Swappable Components for System Software", Proceedings of the Eighth Workshop on HOt Topics in Operating Systems, 2001; [retrieved on May 3, 2013]; Retrieved from Internet <URL:http://ieeexplore.ieee.org/stamp/stamp.jsp?tp=&arnumber=000086>; pp. 1.*

Neamtiu, et al., "Contextual Effects for Version-Consistent Dynamic Software Updating and Safe Concurrent Programming", 2008 ACM; [retrieved on May 3, 2013]; Retrieved from Internet <URL: http://dl.acm.org/citation.cfm?id=1328438>; pp. 37-49.*

Sridhar, et al., "Dynamic Module Replacement in Distributed Protocols", 2003 IEEE; [retrieved on May 3, 2013]; Retrieved from Internet <URL: http://ieeexplore.ieee.org/stamp/stamp.jsp?tp=&arnumber=123513>; pp. 1-8.*

Vlist, et al., "Configuring and controlling ubiquitous comuting infrastracture with semantic connecitons: a tangible and an AR approach", Pers Ubiquit Comput 2013; [retrieved on May 3, 2013]; Retrieved from Internet <URL: http://dl.acm.org/citation.cfm?id=2458739>; pp. 783-799.*

* cited by examiner

SYSTEM AND METHODS FOR REPLACING SOFTWARE APPLICATION CLASSES USING TRANSPARENT OBJECT ADAPTERS

FIELD OF THE INVENTION

The present invention is related to the field of software applications, and more particularly, to systems and methods for modifying existing software applications.

BACKGROUND OF THE INVENTION

Many modern software applications, such a Java® applications, can be characterized as a system comprising multiple subsystems. These different subsystems can be interconnected yet remain separable. Conventionally, when only a particular subsystem of an application in a larger application is to be redesigned such that the remaining portions of the application are unchanged and unaware of the redesign, it is often necessary to provide an object adapter that will emulate replaced objects stemming from the redesign.

An object adapter, often referred to as an adapter design or wrapper pattern, adapts one interface for a class into one that can function with other classes. Specifically, an adapter allows classes that would otherwise comprise incompatible interfaces to function cooperatively. The adapter typically accomplishes this by wrapping its own interface around that of an existing class.

When an old object and a new one have different names or are in different software packages, each comprising a group of related classes of an application program, it is typically necessary to provide a solution based on a wrapper or delegation pattern implemented as an object adapter. With a wrapper or delegation pattern, an object outwardly expresses certain behaviour, but in reality delegates responsibility for implementing that behavior to an associated object.

This is often not an optimal solution, however, because it requires that the adapter instance contain the instance of the class that it wraps. This conventional technique requires that an adapter and the instance wrapped by the adapter be created from both the new subsystem—which ideally should not be aware of the existence of the adapter instances—and those portions of the original application that should otherwise remain unaltered and unaware of the change. With the conventional technique, moreover, there arises a performance penalty if an adapter is created for every instance of a given class where only some of the instances need be referenced from outside the redesigned subsystem.

SUMMARY OF THE INVENTION

The present invention is directed to systems, computer products, and related methods for creating transparent object adapters for use when, within an application such as a Java-based® application, one subsystem of the application is replaced with another. An object of the invention is to avoid the necessity of having to create an adapter and a corresponding wrapped instance when redesign of an application replaces one subsystem of a system comprising a program or application with another subsystem. Another object of the invention is to avoid the penalty that would otherwise be incurred were an adapter created for every instance of a given class of the subsystem even though only some of the instances need to be referenced from outside the subsystem that replaces another. The systems and methods, moreover, can allow simultaneous development of part of an application that is outside of the changed subsystem without waiting for changes to be completed and without altering code outside of the subsystem.

One embodiment of the invention is computer-based system for creating transparent object adapters for replaced classes in an application program. The system can include one or more processors for executing computer-readable code and an object adapter generating module that is configured to execute on the one or more one processors. More particularly, the object adapter can be configured to determine whether an original class of an original subsystem of the application system is referenced by at least one other of the multiple subsystems in response to the subsystem being replaced by a new subsystem. The object adapter can generate a pair of corresponding classes for the original class if the original class is referenced by at least one other of the multiple subsystems. One of the generated classes defines an object adapter class having a same name and software package as the original class. The other defines a new classes.

The object adapter generating module can configure the object adapter class to export all methods referenced by at least one other of the multiple subsystems and to perform, according to predetermined adapter logic, at least one among transforming data and handling references to adapter objects passed as parameters or returned values. The object adapter generating module also can configure the object adapter class and the new class to maintain references to one another.

Another embodiment of the invention is a computer-implemented method for creating transparent object adapters for replaced classes in an application comprising multiple subsystems. The method can include responding to substitution of a new subsystem for an original one of the subsystems by determining whether an original class of the original subsystem is referenced by at least one other of the multiple subsystems. According to the method, if the original class is referenced by at least one of the other multiple subsystems, a pair of corresponding classes for the original class can be generated. One of the generated classes can define an object adapter class having a same name and package as the original class, and the other generated class can define a new class. The object adapter class, more particularly, can be configured to export methods referenced by at least one other of the multiple subsystems and to perform at least one among transforming data and handling references to adapter objects passed as parameters or returned values. The object adapter class and the new class can both be configured to maintain references to one another.

Yet another embodiment is a computer product, such an optical media disk, having computer code embedded therein. The computer code can be configured to cause a computer, when loaded on the computer, to perform the procedures and functions of the above-described method.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
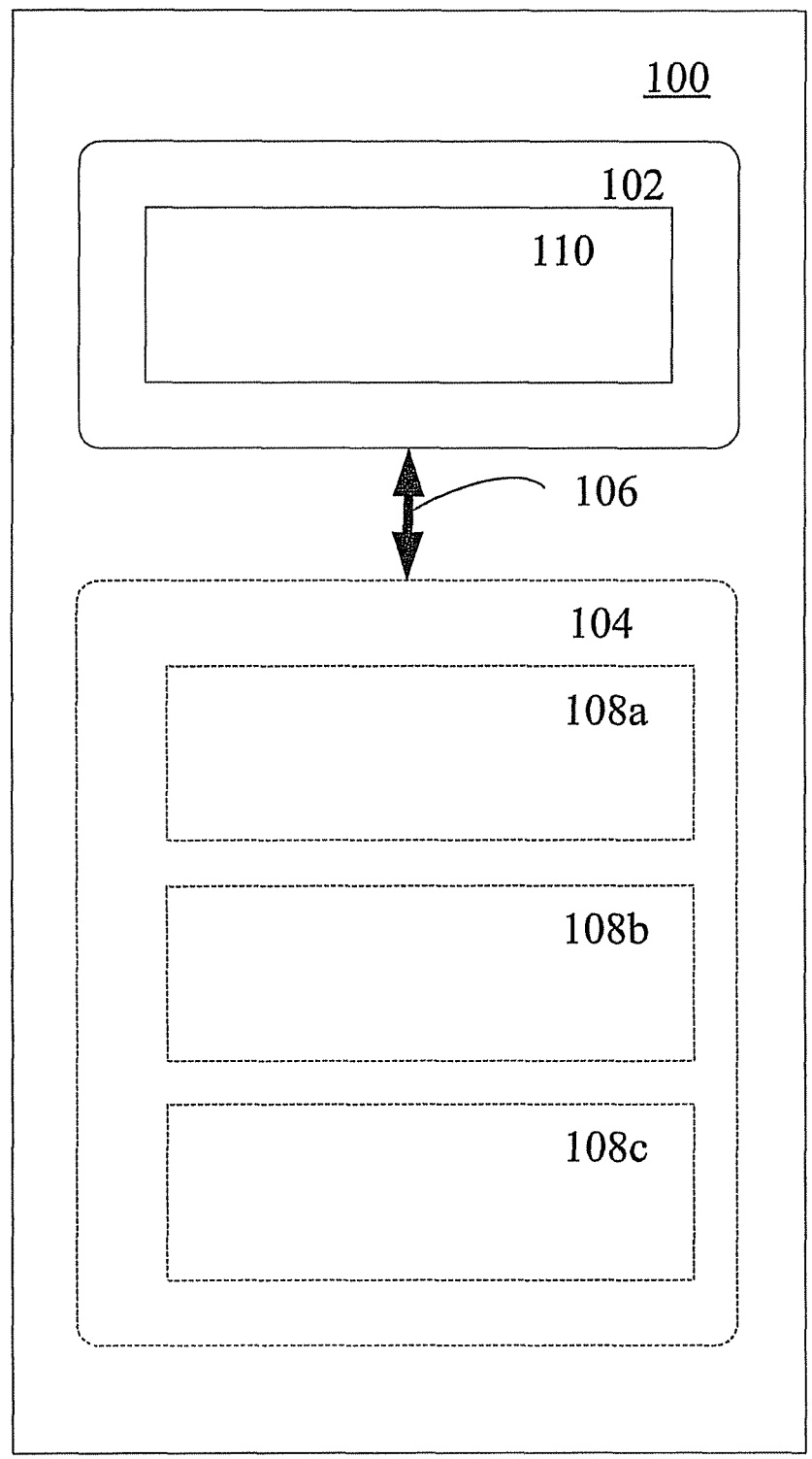
FIG. 1 is a schematic view of a system for creating transparent object adapters, according to one embodiment of the invention, according to one embodiment of the invention.

FIG. 1 is a schematic view of a computer-based system 100 for creating transparent object adapters for replaced classes in an application program comprising multiple application subsystems, according to one embodiment of the invention. The system 100 illustratively comprises one or more logic-based processors 102 comprising registers (not explicitly shown), logic gates (also not shown explicitly shown), and other logic-based circuitry for processing executable code. Optionally, the system 100 can include electronic memory 104 for storing electronic data and executable code 108a-c. The electronic memory 104 is illustratively communicatively linked to the one or more processors 102 through a bus 106.

The system 100 further includes an object adapter generating module 110. The object adapter generating module 110 can be implemented in processor-executable code configured to run on the one or more processors 102 for performing the procedures described herein. Alternatively, however, the object adapter generating module 110 can be implemented in dedicated hardwired circuitry for performing the same procedures. In still another embodiment, the object adapter generating module can be implemented in a combination of executable code and hardwired circuitry.

Figure 2:
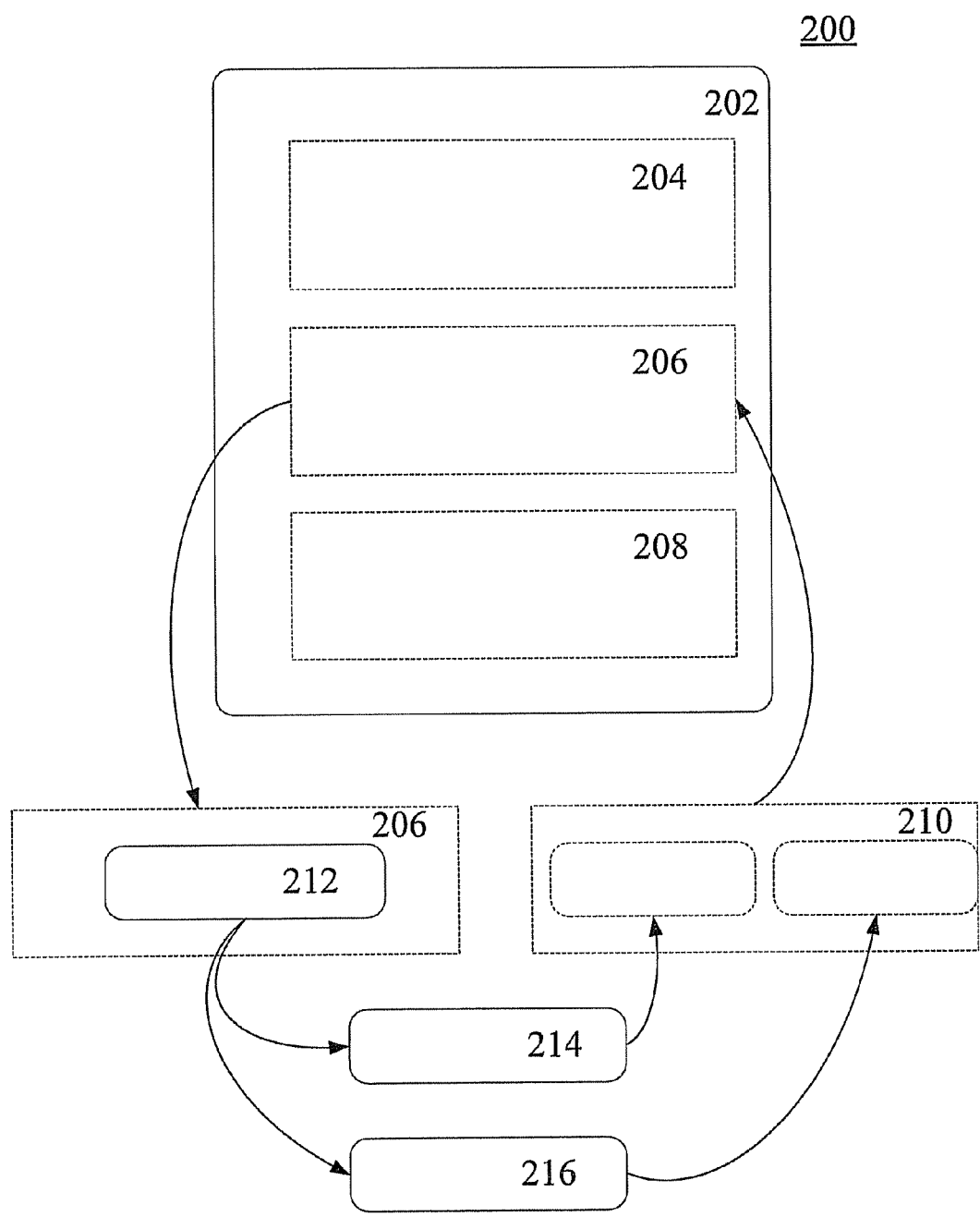
FIG. 2 is a schematic view of certain operative features of the system illustrated in FIG. 1.

Referring additionally now to FIG. 2, certain operative aspects 200 of the object adapter generating module 110 are schematically illustrated with respect to an application program or system 202. The application system 202 illustratively comprises multiple modules or subsystems 204, 206, 208. The application system 202 can comprise, for example, a Java® application. The subsystem 204, 206, 208 of the application system 202 are separable, but interconnected with one another. The operative procedures of the object adapter generating module 110 are initiated when one of the original subsystems 206 of the application system 202 is to be replaced by a new subsystem 210, which requires a different class structure than the original subsystem 206 for which the alternative subsystem is substituted. It can be assumed that for every instance of the original subsystem 206 there exists only one object instance in the new subsystem 210. According to this embodiment, the code comprising the other subsystems 204, 208 of the application system 202 remain unaware of the substitution of the new subsystem 210 for the original subsystem 206.

Operatively, the object adapter generating module 110 initially determines whether any original class of the original subsystem 206 of the application system 202 is referenced by at least one other of the multiple subsystems 204, 208 in response to the subsystem being replaced by the new subsystem 210. If an original class 212 is referenced by at least one other of the multiple subsystems 204, 208, then the object adapter generating module 110 generates a pair of corresponding classes 214, 216 for the original class 212. One of the generated classes defines an object adapter class 214 having the same name and package as the original class 212. The other of the new classes defines a new class 216

More particularly, the object adapter generating module 110 configures the object adapter class 214 to export all methods referenced by at least one other of the multiple subsystems 204, 208. The object adapter generating module 110 also configures the object adapter class 214 to transform data and/or handle references to adapter objects passed as parameters or as returned values. The object adapter generating module 110 further configures both the object adapter class 214 and the new class 216 to maintain references to one another.

Accordingly, the object adapter generating module 110 is able to generate a corresponding pair of new classes—namely, an object adapter class and a new class—for every original class that is referred to from outside the replaced subsystem 206. The methods of the object adapter class 214 make calls into the new subsystem 210, providing any necessary logic needed to transform data or handle references to adapter objects passed as parameters or returned as values. The new class 216 can have any name and any package. The new class 216 is designed solely from the point of view of the new subsystem 210 that is substituted for the original subsystem 206 and does not need, indeed preferably does not implement, any adapter logic.

The object adapter class 214 and the new class 216 maintain references to each other such that when there are no external references to any of these classes, a virtual or software-implemented garbage collector can dispose of both instances. When an instance of one of the classes, the object adapter class 214, an instance of the new class 216 is created and cross references are established. Creating the object adapter class always causes the new class 216 to be created. The object adapter class 214, however, is created only when a reference to the object adapter class needs to be passed to one other of the multiple subsystems 204, 208, which are external to subsystem 206. This configuration allows for a smooth and gradual transition to the use of new classes by the remaining portions of the application system 202.

According to a particular embodiment, the object adapter generating module 110 can be configured to generate the new class 216 (for exposition, here designated as NewClass) to have a private reference attribute to an instance of the original class 212 (for exposition, here designated as OldClass). The reference can be initialized with a null. An adapter object thus need not, and preferably is not, instantiated until it is needed. The NewClass can be configured by the object adapter generating module 110, according to still another embodiment, to define a public method (for exposition, designated as get-AdapterInstance( )), which can be used exclusively when the adapter instance needs to be referenced. The method, get-AdapterInstance( ), can check whether an adapter instance has been initialized. If the adapter instance has not been initialized, the method creates an instance of OldClass, initializes it with a reference to the corresponding NewClass instance, and assigns it to the reference attribute in the New-Class instance. Moreover, the method, getAdapterInstance ( ), is preferably synchronized for thread safety, as will be readily understood by one of ordinary skill.

According to yet another embodiment in the specific context of a Java-based® application, OldClass can be configured to have a private attribute based on a defined class, WeakReference (defined in Java 1.2), the private attribute pointing to the instance of NewClass. The private attribute can be initialized from all constructors of OldClass with a weak reference to the NewClass instance. Two types of constructors can be implemented in OldClass. The first type of constructor takes as a parameter a reference to an instance of NewClass and initializes the WeakReference object with that reference. The constructor is used in the exemplary method, getAdapterInstance ( ), implemented by NewClass.

The second type of constructor for OldClass is a constructor that is called from parts of the application system 202 outside the new subsystem 210. Such a constructor may not be necessary if instances are created only from the new subsystem 210. The constructor initializes the WeakReference attribute with a new instance of NewClass. With this second type of constructor, NewClass implements another constructor that takes as a parameter a reference to the OldClass instance and assigns it to its reference attribute.

Depending on particular design requirements, OldClass and all its methods can be marked as deprecated; in this event, instructions can be provided to developers describing the manner in which to make the transition to the usage of new classes that replace original classes. When the transition is completed for any of the old classes, OldClass, the reference to in NewClass and the method NewClass.getAdapterInstance ( ) can be removed.

The following code is an illustrative implementation of the techniques and procedures thus far described, the implementation showing only the code that is relevant to adapter functionality:

```
package company.product.subproduct.oldpackage;
import java.lang.ref.WeakReference;
public class OldClass
{
    private WeakReference<NewClass> masterInstance = null;
    public OldClass(NewClass masterInstance)
    {
        this.masterInstance = new WeakReference<NewClass>
            (masterInstance);
    }
    public OldClass( )
    {
        masterInstance = new WeakReference<NewClass>
            (new NewClass(this));
    }
    public NewClass getMasterInstance( )
    {
    return masterInstance.get( );
    }
    // A simple example of usage
    public void doSomething( )
    {
        // delegate
        return getMasterInstance( ).doSomething( );
    }
    // A more complicated example that involves two more new classes
with adapters:
// an instance of the adapter YetAnotherOldClass is passed by the caller as
// a parameter and an an instance of an adapter AnotherOldClass is
returned to the outside caller
    public AnotherOldClass doSomethingElse(YetAnotherOldClass
        parameter)
    {
        // delegate
        return
(getMasterInstance( ).doSomethingElse(parameter.getMasterInstance( )).-
getAdapter Instance( );
    }
}
package company.product.subproduct.newpackage;
import company.product.subproduct.oldpackage.OldClass;
public class NewClass
{
    private OldClass adapterInstance = null;
    public NewClass( )
    {
    }
    public NewClass(OldClass adapterInstance)
    {
        this.adapterInstance = adapterInstance;
    }
    public synchronized OldClass getAdapterInstance ( )
    {
        if (adapterInstance == null)
        {
            adapterInstance = new OldClass(this);
        }
        return adapterInstance;
    }
...
}
```

It should be noted that with the support of the Java environment, for example, the lifecycle of the instances of adapters and new class can be managed by these classes themselves.

Moreover, the need to create the adapter as an upfront system can be avoided; the adapter is created only as needed (i.e., only when it is referenced by an external subsystem). The instances of the new class are created as needed, and adapters are created only when these instances need to be referenced by an external subsystem.

In one aspect, external subsystems can—though they need not in order to keep the whole system workable—be changed gradually to reference the new classes. All external subsystems are eventually modified to reference the new classes directly. Subsequently, the adapter can be disposed of. Even if it is preserved, however, there a very minor penalty (one attribute initialized with null) can be applied for maintaining it in place. There is no requirement that external subsystems go through the adapters. Quite the opposite: as the external subsystems go through their own cycle of development and maintenance, they can, and typically should be, modified to reference the new classes directly. This is one of the benefits of the simultaneous—or decoupled—development of the new subsystem and the rest of the subsystems.

Figure 3:
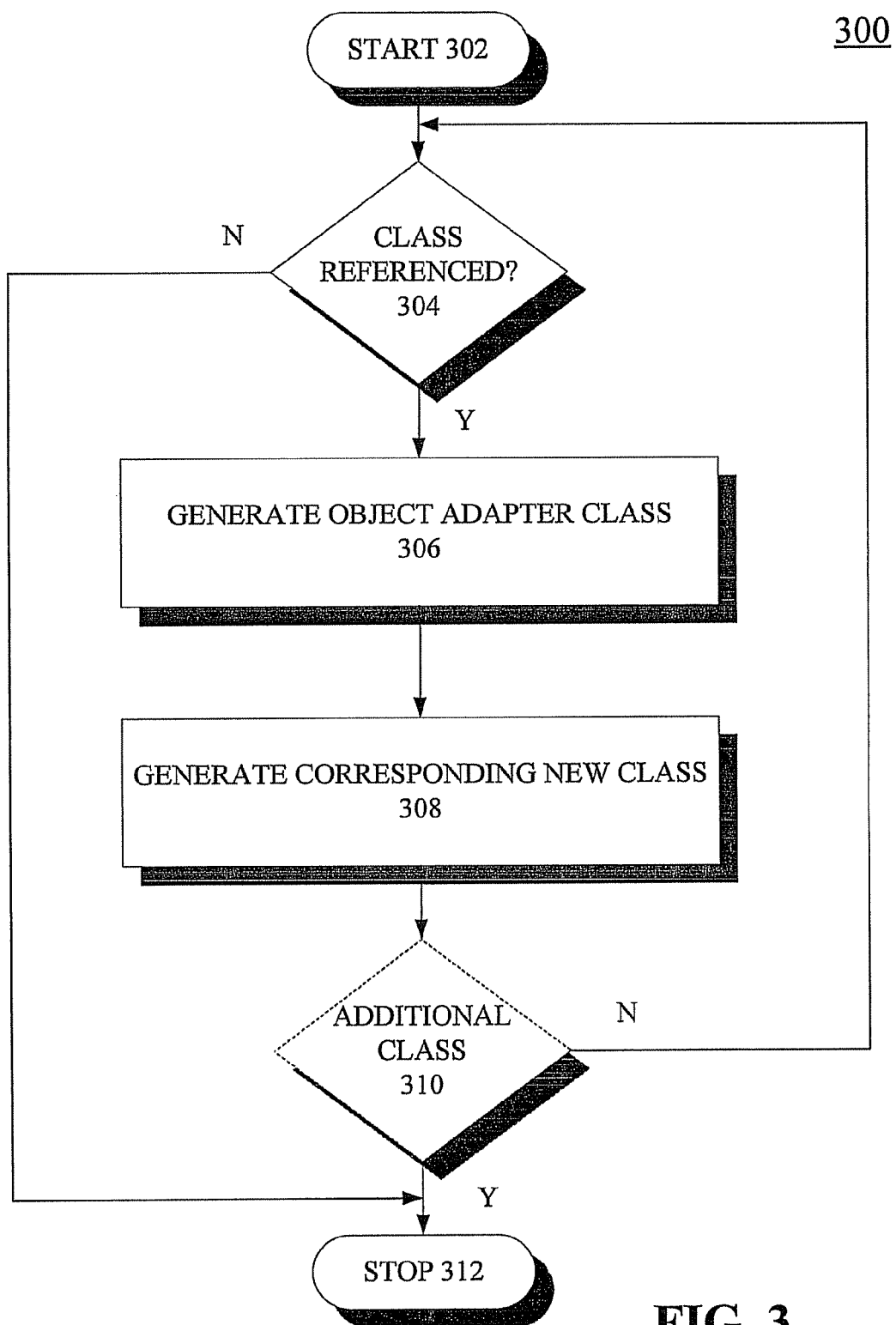
FIG. 3 is a flowchart of exemplary steps in a method for creating transparent object adapters, according to another embodiment of the invention.

FIG. 3 is a flowchart of exemplary steps in a method 300 for creating transparent object adapters for replaced classes in an application comprising multiple subsystems. The method 300 illustratively includes, after the start at step 302, determining at step 304 whether an original class of the original subsystem is referenced by at least one other of the multiple subsystems in response to substituting a new subsystem for an original one of the subsystems.

If the original class is referenced by at least one of the other multiple subsystems, however, then a pair of corresponding classes are generated based upon the original class. Specifically, at step 306 a class defining an object adapter class is generated, the object adapter class having the same name and package as the original class. The other of the generated classes, generated at step 308, defines a new class.

It is to be noted, however, that the order in which the pair of classes are generated according to the method 300 is only illustrative. In other embodiments, the order in which the object adapter class and new class are generated can be reversed. In still other embodiments, both pair of classes can be generated simultaneously or nearly so.

If the original subsystem is not referenced by at least one of the other subsystems, then the method 300 proceeds to step 310 where optionally the method 300 can include determining whether the original subsystem includes one or more additional classes. If one or more additional classes remain, then the method 300 optionally can return to step 304 and the procedure repeated. The method 300 illustratively concludes at step 312.

There can be several different process flows. In one process flow, an instance of a new class is created and used by either the new subsystem or an external subsystem that has become aware of the existence of the new class. No adapter instance is ever created.

In another process flow, an instance of the adapter is created from an external subsystem, which the system assumes still performs with the old class; the system need not be aware that it does not work with the old class. An instance of the new class is immediately created and linked to the adapter. The instance of the new class can itself create other instances within the new subsystem, but adapters for these instances will be created only as needed, as discussed in the follow paragraph.

In still another process flow, an external subsystem makes an adapter call into the new subsystem through a static method or through an adapter method, and this call needs to return a reference to an old object (or references to old objects). The adapter that returns the call to the external subsystem obtains these references by calling the above-described method for obtaining the references, exemplified by method getAdapterInstance( ), on the instance or instances of the new class or classes. Two possible courses of the process can occur at this point: (1) there is already an instance of the adapter for the new class that has been previously created—then it is returned, or (2) the adapter instance did not exist yet, but then it is created and returned.

When there are no more references to the adapter (from external systems only) and to the new class (from anywhere), both the adapter and the new class can be collected for disposing. In particular, in a Java environment, when there are no references to the adapter and new class, both can be garbage collected "automatically" without the active participation of any component of the program.

As generated according to the method 300, the object adapter class is configured to export methods referenced by at least one other of the multiple subsystems and to perform at least one among transforming data and handling references to adapter objects passed as parameters or returned values. Moreover, the object adapter class and the new class are configured according to the method 300 so as to maintain references to one another.

The method 300, according to one embodiment, can further comprise configuring the new class so that the new class is devoid of adapter logic. According to still another embodiment, the method 300 further comprises disposing of instances of the object adapter class and the new class when there are no external references to either class by at least one of the other subsystems. The disposing, according to a particular embodiment, can be performed by an application-implemented garbage collector.

According to yet another embodiment, the method 300 can further comprise configuring the new class to have a private reference attribute to an instance of the original class. Additionally, according to one embodiment, the private reference attribute can be initialized with a null such that an adapter object is not instantiated until required by one of the other subsystems.

According to still another embodiment, the method can further comprise configuring the new class to have a public method that references an adapter instance. The public method, according to a particular embodiment, can be configured to determine whether the adapter instance is initialized and, if the adapter is not initialized, to create an instance of the original class, initialize the instance of the original class with a reference to a new class instance, and assign to the instance of the original class a reference attribute of the new class instance.

According to another embodiment of the method 300, the original class can contain a private attribute that points to an instance of the new class. The private attribute be initialized from each constructor of the original class with a weak reference to the instance of the new class.

The invention, as also already noted, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for creating transparent object adapters for replaced classes in an application comprising multiple subsystems, the method comprising:
   in response to substituting a new subsystem for an original subsystem from the multiple subsystems, determining whether an original class of the original subsystem is referenced by at least one other of the multiple subsystems;
   if the original class is referenced by at least one of the other multiple subsystems, generating an object adapter class and a new class based on the original class, the object adapter class comprising a class having a same name and package as the original class, the new class comprising a public method that references the object adapter class, and the public method configured to determine whether the object adapter class is initialized and, if the adapter is not initialized, to create an instance of the original class, initialize the instance of the original class with a reference to the new class, and assign to the instance of the original class a reference attribute of the new class; and
   invoking the public method when the object adapter class needs to be referenced;
   wherein the object adapter class is configured to export methods referenced by at least one other of the multiple subsystems and to perform at least one among transforming data and handling references to adapter objects passed as parameters or returned values, and wherein the object adapter class and the new class are configured to maintain references to one another.

2. The method of claim 1, further comprising configuring the new class without adapter logic.

3. The method of claim 1, further comprising disposing of instances of the object adapter class and the new class when there are no external references to either class by at least one of the other subsystems.

4. The method of claim 3, wherein the disposing is performed by an application-implemented garbage collector.

5. The method of claim 1, further comprising configuring the new class to have a private reference attribute to an instance of the original class.

6. The method of claim 5, further comprising initializing the private reference attribute with a null such that an adapter object is not instantiated until required by one of the other subsystems.

7. The method of claim 1, wherein the original class has a private attribute that points to an instance of the new class, wherein the private attribute is initialized from each constructor of the original class with a weak reference to the instance of the new class.

8. A computer-based system for creating transparent object adapters for replaced classes in an application program comprising computer-readable code defining multiple subsystems, the system comprising:
   at least one processor for executing computer-readable code; and
   an object adapter generating module that is configured to execute on the at least one processor, the object adapter being further configured to:

determine whether the original class of an original subsystem of the application system is referenced by at least one other of the multiple application subsystems in response to the original subsystem being replaced by a new subsystem;

generate an object adapter class and a new class based on the original class if the original class is referenced by at least one other of the multiple subsystems, the object adapter class comprising a class having a same name and package as the original class, the new class comprising a public method that references the object adapter class, and the public method configured to determine whether the object adapter class is initialized and, if the adapter is not initialized, to create an instance of the original class, initialize the instance of the original class with a reference to a new class instance, and assign to the instance of the original class a reference attribute of the new class;

invoke the public method when the object adapter class needs to be referenced;

configure the object adapter class to export all methods referenced by at least one other of the multiple subsystems and to perform, according to predetermined adapter logic, at least one among transforming data and handling references to adapter objects passed as parameters or returned values; and configure the object adapter class and the new class to maintain references to one another.

9. The system of claim 8, wherein the new class is configured without adapter logic.

10. The system of claim 8, wherein the object adapter generating module configures the new class to have a private reference attribute to an instance of the original class and initializes the private reference attribute with a null such that an adapter object is not instantiated until required by one of the other subsystems.

11. The system of claim 8, wherein the original class comprises a private attribute that points to an instance of the new class, and wherein the private attribute is initialized from each constructor of the original class with a weak reference to the instance of the new class.

12. A non-transitory computer-readable storage medium in which is embedded computer-readable code that when loaded to and executed by a computer creates transparent object adapters for replaced classes in an application program comprising multiple subsystems by:

determining whether an original class of an original subsystem from the multiple subsystems is referenced by at least one other of the multiple subsystems in response to a new subsystem replacing the original subsystem;

if the original class is referenced by at least one of the other multiple subsystems, generating an object adapter class and a new class based on the original class, the object adapter class comprising a class having a same name and package as the original class, the new class comprising a public method that references the object adapter class, and the public method configured to determine whether the object adapter class is initialized and, if the adapter is not initialized, to create an instance of the original class, initialize the instance of the original class with a reference to a new class instance, and assign to the instance of the original class a reference attribute of the new class; and invoking the public method when the object adapter class needs to be referenced;

wherein the object adapter class is configured to export methods referenced by at least one other of the multiple subsystems and to perform at least one among transforming data and handling references to adapter objects passed as parameters or returned values; and wherein the object adapter class and the new class are configured to maintain references to one another.

13. The non-transitory computer-readable storage medium of claim 12, wherein the new class is configured without adapter logic.

14. The non-transitory computer-readable storage medium of claim 12, wherein the computer-readable code causes the computer to generate the new class so as to have a private reference attribute to an instance of the original class and initialize the private reference attribute with a null such that an adapter object is not instantiated until required by one of the other subsystems.

15. The non-transitory computer-readable storage medium of claim 12, wherein the original class comprises a private attribute that points to an instance of the new class.

16. The non-transitory computer-readable storage medium of claim 15, wherein the private attribute is initialized from each constructor of the original class with a weak reference to the instance of the new class.

* * * * *